United States Patent
Ludwig

[11] Patent Number: 6,113,959
[45] Date of Patent: Sep. 5, 2000

[54] METHOD OF PACKAGING MEAT

[75] Inventor: Wolfgang Ludwig, Destin, Fla.

[73] Assignee: WTI, Inc., Kingston, N.Y.

[21] Appl. No.: 09/160,984

[22] Filed: Sep. 25, 1998

[51] Int. Cl.$^7$ ............ A23L 1/318; B65B 25/00; B65B 29/00

[52] U.S. Cl. ............ 426/281; 426/289; 426/290; 426/302; 426/396; 426/410; 426/415; 426/90; 426/92

[58] Field of Search ............ 426/92, 90, 129, 426/132, 113, 281, 290, 289, 302, 296, 415, 410, 396

[56] References Cited

U.S. PATENT DOCUMENTS

| | | | |
|---|---|---|---|
| 2,440,517 | 4/1948 | Lesparre | 426/92 |
| 2,687,961 | 8/1954 | Ellis | 426/281 |
| 2,759,830 | 8/1956 | Tuceda | 426/132 |
| 2,905,561 | 9/1959 | Barnett et al. | 426/92 |
| 3,042,532 | 7/1962 | Daline | 426/132 |
| 3,506,455 | 4/1970 | Savage et al. | 426/281 |
| 3,552,978 | 1/1971 | Inklaar | 426/281 |
| 3,597,228 | 8/1971 | Jeppson et al. . | |
| 3,864,503 | 2/1975 | Steenolsen | 426/129 |
| 3,881,023 | 4/1975 | Wilson | 426/132 |
| 3,900,575 | 8/1975 | Rapoport | 426/92 |
| 3,961,090 | 6/1976 | Weiner | 426/281 |
| 4,442,868 | 4/1984 | Smith et al. | 426/129 |
| 4,521,435 | 6/1985 | Peters | 426/92 |
| 4,746,522 | 5/1988 | Wofford et al. | 426/281 |
| 4,940,590 | 7/1990 | Williams et al. | 426/92 |
| 5,004,618 | 4/1991 | Buckholz et al. | 426/281 |
| 5,057,329 | 10/1991 | Stypula | 426/92 |
| 5,262,188 | 11/1993 | Nocquet | 426/92 |
| 5,374,457 | 12/1994 | Juhl et al. | 426/129 |
| 5,431,937 | 7/1995 | Kandl et al. | 426/92 |
| 5,436,017 | 7/1995 | Ludwig et al. . | |
| 5,449,524 | 9/1995 | Ludwig . | |
| 5,498,432 | 3/1996 | Leu | 426/92 |
| 5,505,972 | 4/1996 | Ludwig | 426/281 |
| 5,514,400 | 5/1996 | Gray | 426/129 |
| 5,564,332 | 10/1996 | Ludwig . | |
| 5,702,741 | 12/1997 | Reutimann | 426/92 |
| 5,705,214 | 1/1998 | Ito et al. | 426/132 |
| 5,736,180 | 4/1998 | Peiffer et al. | 426/92 |
| 5,908,648 | 6/1999 | Afman et al. | 426/92 |

FOREIGN PATENT DOCUMENTS

| | | | |
|---|---|---|---|
| 149403 | 8/1949 | Australia | 426/129 |
| 508172 | 10/1992 | European Pat. Off. | 426/281 |
| 1500187 | 2/1978 | United Kingdom | 426/129 |
| WO82/01640 | 5/1982 | WIPO | 426/281 |
| WO 96 14760 | 5/1996 | WIPO . | |

OTHER PUBLICATIONS

Randall, K., et al; Journal of Food Science, vol. 60, No. 4, 1995, pp. 667–672 684 XP002126361;.

Primary Examiner—Steven Weinstein
Attorney, Agent, or Firm—Herbert Dubno

[57] ABSTRACT

Meat products such as poultry parts are injected with a base marinade or a base marinade massaged into the meat, the base marinade contains less than the total amount of seasoning desired in the meat product. The injected meat product is then placed upon a packaging material such as a tray previously coated with a seasoning layer and the meat product is then coated with another seasoning layer before being sealed in the packaging material so that the balance of the seasoning is supplied from the seasoning layers.

15 Claims, 2 Drawing Sheets

METHOD OF PACKAGING MEAT

FIELD OF THE INVENTION

The present invention relates to a method of producing packaged food products, utilizing an injection of marinade into the meat portions.

BACKGROUND OF THE INVENTION

It is known, for example in the processing of poultry, to cut up the poultry into parts and to differentially inject a marinade, usually a solution of one or more phosphates, salt and even some flavoring substances, for example, a celery extract or powder, so that different parts are provided with different quantities or proportions of the solution. The breast meat, for example, may be injected with a greater proportion of the solution than wing meat or leg meat. The poultry can be differently injected without being cut up and, of course, the differential injection approach can be used for other kinds of meat. Reference may be made to U.S. Pat. No. 5,449,524 dated Sep. 12, 1995 and U.S. Pat. No. 5,505,972 dated Apr. 9, 1996 which describe an apparatus for differential injection wherein different paths are provided for the parts to be injected. Mention may also be made to U.S. Pat. No. 5,436,017 dated Jul. 25, 1995 which describes solutions which can be used for injection into meats, especially poultry. Another system for introducing a liquid into meat, particularly effective for boneless meat products, is massaging using, e.g. a machine of the type described in the commonly owned U.S. Pat. No. 5,564,332 of Oct. 15, 1996.

One of the problems faced with packaged meats is that the product within the package has a poor appearance. Liquids, for example, tend to drain from the meat into the package and to pool in the latter. It has been the practice to include absorption sheets within the package to take up the liquids which tend to drain, especially after the meat has been injected. Such absorptive sheets themselves tend to become discolored and the presence of a wet sheet in contact with the meat may be objectionable.

Where it is desirable to provide significant flavoring for the meat product, in the past the flavoring additives were generally included in the marinade or solution injected into the meat or tumbled or massaged.

These systems should be distinguished from systems in which cooked meat products are marketed. In such cases, it is known to cover the meat product with coloring agents and flavoring seasonings and then to cook the product which is subsequently packaged. When the product is initially cooked, the appearance generally is wholesome whereas in time, the appearance of the cooked product tends to deteriorate.

OBJECTS OF THE INVENTION

It is, therefore, the principal object of the present invention to provide an improved method of producing packaged food products whereby the aforementioned drawbacks can be avoided.

Another object of the invention is to provide a method for the purposes described which is free from the drawbacks of earlier systems.

SUMMARY OF THE INVENTION

These objects and others which will become apparent hereinafter are attained, in accordance with the invention in a method of producing a packaged food product which comprises injecting and/or massaging into the food product a base marinade which can contain salt, phosphates and even some of the flavoring ultimately desired in the finished products, optionally coating a packaging unit with seasoning agents in the form of a powder, liquid, solid, glaze (gel) or gel-forming solutions, introducing the injected or massaged meat product into that packaging unit, covering the injected meat product with an additional quantity of that seasoning, gel, gel-forming solid composition or liquid, and sealing the package. The term "massaged" is here used to include agitation of the meat in the base marinade by paddles or by tumbling.

As a general matter the seasoning layer can be coated onto at least one surface of the packaging material and thus applied to the meat product.

With this basic principle, any liquid which tends to drain from the meat product forms a solution or suspension with the powdered solid seasoning in the package and advantageously forms a glaze or gel therewith which has a significantly better appearance than liquid of an unknown source which has hitherto tended to pool in such packages before, and does not require an absorptive sheet since the gel or glaze has a sufficient viscosity. Furthermore, the seasonings applied to the surface of the product in the last step prior to sealing, absorb liquid from the meat product if necessary to form the glaze over the product.

The term "glaze" is used to describe a liquid which, when applied to a meat product prior to roasting or baking of the meat product, will produce a shiny appearance on the product and will be adherent to the product and generally will be highly flavored. Glazes can be applied in liquid form or as powders (solids) which produce a more or less gelatinous substance when contacted by liquid draining from the meat product.

According to a more specific feature of the invention, the meat product is fed from a cut-up unit, i.e. a machine which can be of conventional construction, and subdivides the whole food product into different parts. Poultry, for example, can be subdivided into breasts, thighs, legs, wings, legs with thighs attached, etc., which can be fed along separate conveyor paths to the injector.

Preferably four such paths are provided and the different food portions, for example, breasts, thighs, legs and wings are injected to different extents with a base marinade which can have a minimum of seasoning and normally is an aqueous solution of salts and phosphates. The differential injection allows the different poultry parts to receive different amounts of the base marinade. The main seasoning will be a result of mixing of later-applied seasonings with the injection liquid. A preferred differential injection is effected as described in the commonly owned U.S. Pat. No. 5,505,972.

Following the differential injection, the various arts are portioned by any conventional means, e.g. acceleration and slow-down of a conveyor, counting or the like so that a packaged portion is segregated for each of the kinds of parts into which the poultry has been subdivided. For example, a package portion may be two, four or six breasts, four or six thighs, eight wings, etc.

An alternative to differential injection, for introducing the base marinade into the meat, is massaging, e.g. with a machine of the type described in U.S. Pat. No. 5,564,332.

Prior to inserting that portion into a packaging unit, the packaging unit, for example, a tray which may be wrapped with a transparent foil, a plastic bag or even a portion of plastic foil which is later to be folded to seal the product, is coated with an additional seasoning in powder or liquid form, preferably in a composition which, when contacted by liquid drains from the food, forms a gel, viscous glaze or some other less flowable product of uniform and aesthetic coloration.

The portion or group of food products can then be placed in the package on that seasoning layer, thereby ensuring that the package-contacting side of the meat will also be fully flavored.

The food inserted into the package is then coated with additional quantities of the seasoning in powder or liquid form and the package is then sealed or, in the case of trays, wrapped and sealed. The seasoning layers or materials can contain coloring agents to the extent permitted.

The actual packaging can be done in any conventional way. For example, the grouped or portion food product, i.e. the pieces of food after injection of the base marinade, can be fed to a roll-stock machine of the type producing trays from a foil material in which the first seasoning layer can be deposited and into which the food product can be placed, whereupon the second seasoning layer is applied onto the food product. The cover of the tray can then be applied from the same material after the drawing of a vacuum or replacement of the atmosphere if desired. The system can operate, therefore, under normal atmosphere, with the drawing of a vacuum in the pack or with the introduction of a modified atmosphere.

Alternatively, preformed trays can be used, also initially coated with the first seasoning layer, whereupon the second seasoning layer is applied to the food product in the trays which can be fed to a sealing machine, i.e. a machine for wrapping the tray, again under vacuum, normal atmosphere, or modified atmosphere.

Finally, a tube type of packing can be used in which the food product is introduced into a tube which at its bottom portion is coated with the first seasoning layer, the food product being then coated with the second seasoning layer before it is introduced into the tube which can be sealed with or without vacuum and under ordinary atmosphere or modified atmosphere.

The seasoning layer can include a liquid which can be the same as the base marinade and powder or liquid seasoning agents or flavoring agents and/or glazing substances. The first and second seasoning layers can, however, be exclusively powders if desired. When the meat product is removed from the package, usually by the consumer, the meat product with the glaze or seasoning thereon may be roasted or cooked in some other way.

The method of the invention thus can comprise the steps of:

(a) injecting or massaging or tumbling into a food (e.g. meat) product a base marinade containing less than a certain amount of seasoning for the meat product;

(b) optionally coating a surface of a packaging material with a first seasoning layer;

(c) positioning the meat product after injection with the base marinade on the first seasoning layer if one has been provided;

(d) then coating at least a surface of the food product to be packed turned away from the surface of the packaging material with a second seasoning layer; and (e) directly thereafter sealing the packaging material around the food product whereby the seasoning layers contribute seasoning to the meat product making up the certain amount of seasoning.

In addition, the food can comprise:

($a_1$) cutting up a plurality of, for example, chicken, and subdividing same into a plurality of kinds of parts including at least breasts, legs and wings;

($a_2$) advancing each of the kinds of parts along a respective path for injection with the base marinade; and ($a_3$) injecting different amounts of the base marinade into the respective kinds of parts.

Preferably the method also comprises the step of:

($c_1$) grouping the parts along the respective paths into packaging portions and placing each portion upon the respective surface of the packaging material for packing of each the portion.

BRIEF DESCRIPTION OF THE DRAWING

The above and other objects, features, and advantages will become more readily apparent from the following description, reference being made to the accompanying drawing in which.

SPECIFIC DESCRIPTION

While the invention is applicable to any food product which can be injected with a marinade or provided by massaging, tumbling with the marinade, basically a solution of salt, phosphates and possibly a celery extract in water, for example, pork loins, beef products and the like, the invention will be described hereinafter as it applies to the processing of poultry, especially chicken.

Figure 1:
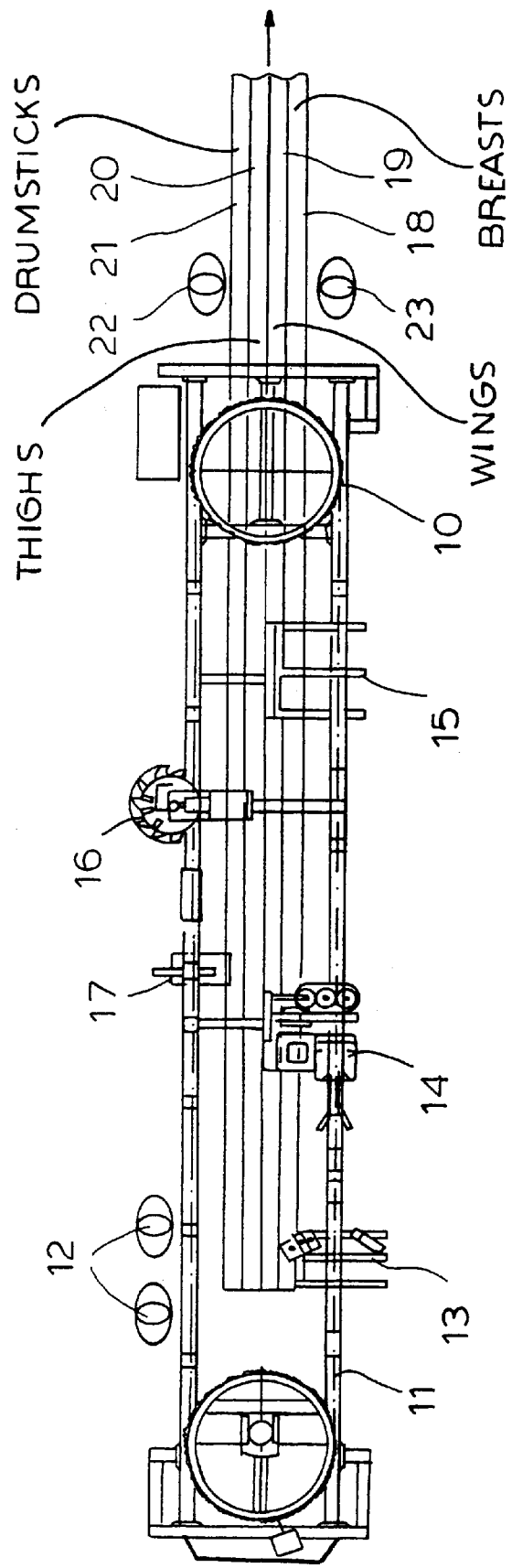
FIG. 1 is a diagrammatic plan view of a chicken cut-up machine which can be used in an early stage of the method of the invention.

Poultry can be subdivided into parts in, for example, a chicken cut-up machine as shown in FIG. 1 in which the chicken is transported on hangers past cutters which subdivide the fowl into at least three and preferably four parts. In FIG. 1, such a machine is shown at 10 and comprises a conveyer system represented at 11 with hangers 12 carrying the poultry product past a wing cutter 13, a breast processor 14, a leg processor 15, a thigh drum cutter 16 and an unloader drum 17 all of which are conventional in the art. The machine has parallel conveyers 18, 19, 20 and 21 respectively for the breasts, wings, thighs and drumsticks or legs. Graders may be stationed at 22 and 23 to be certain that the parts passed to the injector are of proper quality.

Figure 2:
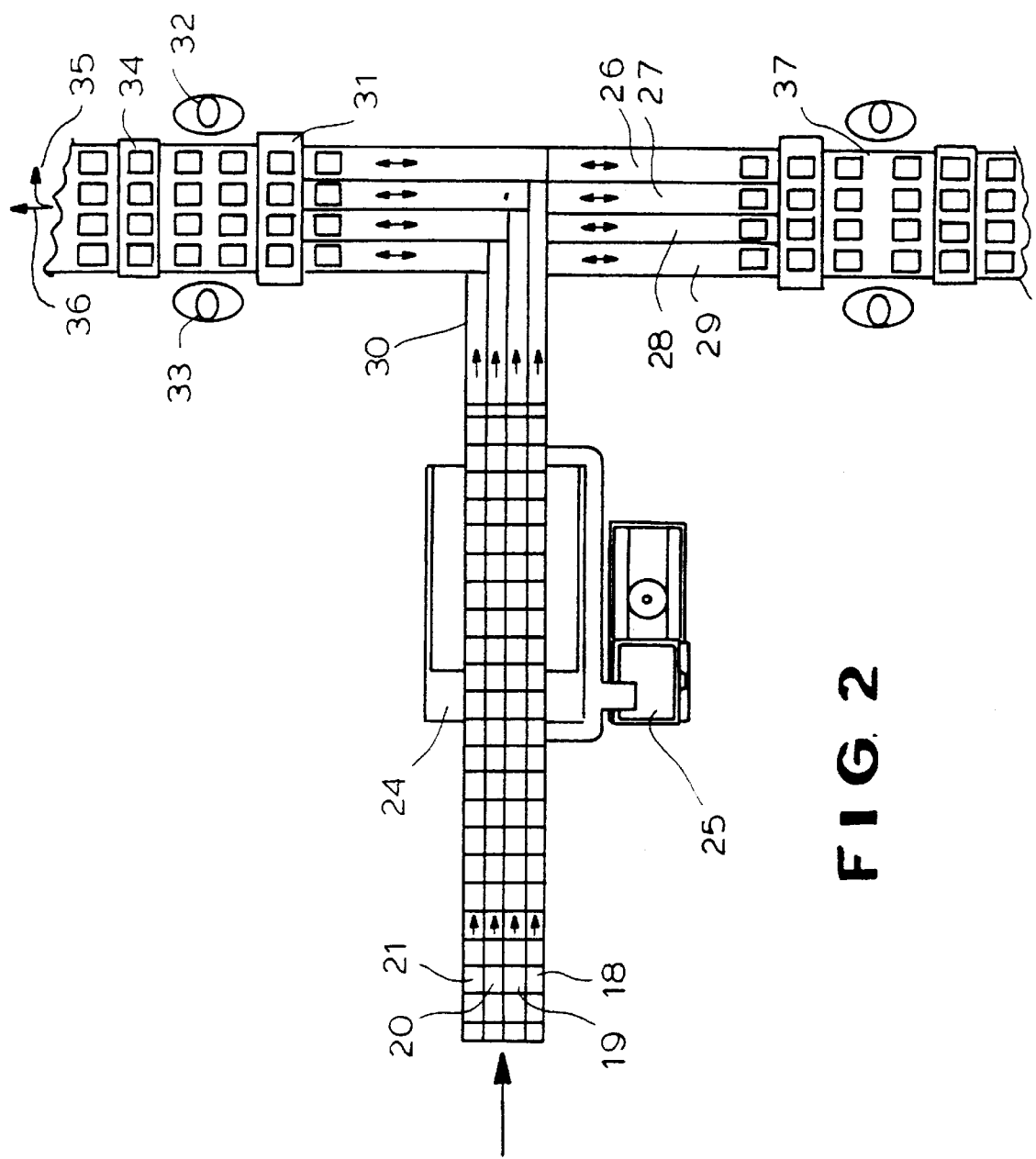
FIG. 2 is a diagrammatic plan view of the processing apparatus according to the invention.

The breasts, wings, thighs and drumsticks are fed by the conveyers 18, 19, 20 and 21 to an injector 24 (FIG. 2) which may be of the differential type, injecting different quantities of a base marinade into the different chicken parts. The injector 24 is equipped with a brine tank 25 supplying the base marinade to the needles of the injector. Alternatively a massager of the type shown in U.S. Pat. No. 5,564,332 can be used.

The chicken parts are fed to respective conveyers 26, 27, 28 and 29 for the respective chicken parts through a marinade or positioning stage 30 which groups those parts into portions for a particular package. The conveyers 26–29 are reversible depending upon the type of packing ultimately desired.

At 31, individual trays can be positioned on the conveyer and the bottoms of the trays are coated with the first seasoning layer, the respective groups of chicken parts are inserted and an operator at 32 or 33 can inspect the trays to be certain that the chicken parts are positioned correctly. At 34 the second layer in liquid or powder form is applied and the coated product in the tray is delivered at 35 to a sealing machine for wrapping the package or at 36 to a machine for applying a cover. In either case, a vacuum can be drawn or a modified atmosphere provided as desired.

Alternatively, the chicken parts can be fed in the opposite direction onto trays previously coated with liquid or powder seasoning forming the first layer of a roll-stock machine using preformed trays and represented at 37, the final seasoning layer being then applied and the product sealed. The packing is here carried out perpendicular to the direction in which the chicken parts are fed initially but it is also possible to carry out the packing and coating in line or to provide a roll-stock machine with preformed trays which moves the product perpendicular to the direction of displacement of the conveyers 26–29. Instead of the station 37, a tube-packing station can be provided as has been previously mentioned.

I claim:

1. A method of packaging a meat product in a state requiring cooking before consumption comprising the steps of:
   (a) introducing into said meat product a base marinade containing less than a certain amount of seasoning for said meat product;
   (b) positioning said meat product, after introducing said base marinade, onto a surface of a packaging material wherein said surface of said packaging material has been coated with a first seasoning layer before said meat product is positioned thereon;
   (c) then coating at least the surface of said meat product which is to be turned away from said coated surface of the packaging material with a second seasoning layer; and
   (d) directly after said meat product coating step, sealing said packaging material around said meat product in a state of the meat product requiring cooking before consumption; said first and second seasoning layers contribute seasoning to said meat product making up said certain amount of seasoning, and said first and second seasoning layers being capable of forming a gelatinous substance when contacted with an liquid which tends to drain from said meat product during storage in the packaging material to eliminate pooling in the package of any liquid which drains from the meat product.

2. The method defined in claim 1 wherein said base marinade is massaged into said meat product in step (a).

3. The method defined in claim 1 wherein said base marinade is injected into said meat product in step (a).

4. The method defined in claim 1 wherein said meat product is a part of a fowl, said method further comprising the steps of:
   ($a_1$) cutting up a plurality of fowls and subdividing same into a plurality of kinds of parts including at least breasts, legs and wings;
   ($a_2$) advancing each of said kinds of parts along a respective path for introducing said base marinade; and
   ($a_3$) introducing said base marinade by injecting different amounts of said base marinade into the respective kinds of parts.

5. The method defined in claim 4, further comprising the step of:
   ($c_1$) grouping the parts along the respective paths into packaging portions and placing each portion upon the respective said surface of said packaging material for packing of each said portion.

6. The method defined in claim 5 wherein said surface of said packaging material is a bottom of a tray.

7. The method defined in claim 6 wherein said tray is a preformed tray which is wrapped with a flexible wrapping material in step (d).

8. The method defined in claim 6 wherein said tray is shaped in a flexible material which is then wrapped around said meat product in said tray in step (d).

9. The method defined in claim 4 wherein, in step ($a_1$) said fowl is cut up additionally to separate thighs as a kind of part, the thighs of said fowl being fed along a path separate from said breasts, said legs and said wings.

10. The method defined in claim 1 wherein at least one of said first and second seasoning layers is a layer of a powder.

11. The method defined in claim 1 wherein at least one of said first and second seasoning layers is a layer of a liquid.

12. The method defined in claim 1 wherein at least one of said first and second seasoning layers has a composition such that a glaze is formed on the meat product.

13. The method defined in claim 1, further comprising the step of drawing a vacuum from said packaging material in step (d) to vacuum-pack said meat product.

14. The method defined in claim 1, further comprising the step of changing an atmosphere around said meat product in step (d) to form a pack of said meat product with a modified atmosphere.

15. The method defined in claim 1 wherein said packaging material is material from a roll-stock machine.

* * * * *